July 17, 1923. Re. 15,659

T. I. DUFFY

SPRING SUSPENSION

Original Filed Nov. 1, 1915 2 Sheets-Sheet 1

Witness:
Harry S. Gaither

Inventor:
Thomas I. Duffy
William H. Hale
Atty

July 17, 1923. Re. 15,659

T. I. DUFFY

SPRING SUSPENSION

Original Filed Nov. 1, 1915 2 Sheets-Sheet 2

Witness:
Harry S. Gaither

Inventor:
Thomas I. Duffy
William W. Hale
Atty

Reissued July 17, 1923. Re. 15,659

UNITED STATES PATENT OFFICE.

THOMAS I. DUFFY, OF CHICAGO, ILLINOIS, ASSIGNOR, BY MESNE ASSIGNMENTS, TO AUTO SPECIALTIES MANUFACTURING COMPANY, OF ST. JOSEPH, MICHIGAN, A CORPORATION OF CALIFORNIA.

SPRING SUSPENSION.

Original No. 1,213,761, dated January 23, 1917, Serial No. 58,996, filed November 1, 1915. Application for reissue filed December 10, 1918. Serial No. 266,167.

*To all whom it may concern:*

Be it known that I, THOMAS I. DUFFY, a citizen of the United States, and a resident of Chicago, in the county of Cook and State of Illinois, have invented certain new and useful Improvements in Spring Suspensions; and I do hereby declare that the following is a full, clear, and exact description thereof, reference being had to the accompanying drawings, and to the characters of reference marked thereon, which form a part of this specification.

This invention relates to improvements in spring suspension for vehicles and refers more specifically to that type of spring suspension which is so constructed and arranged as to absorb minor shocks or vibrations, which are too small or too fast to be absorbed by the main or leaf spring and also to means to absorb or neutralize the recoil action of the riding spring.

A purpose of the invention is to provide a simple device which may be applied to standard springs, and, when so applied, constitute means for absorbing the lighter vibrations imposed on the riding spring, and also for absorbing or neutralizing the rebound or recoil action of the spring.

Other objects of the invention are to improve and simplify spring suspension for vehicles, and the invention consists in the combination and arrangement of the parts shown in the drawing and described in the specification, and is pointed out in the appended claims.

I have herein shown my improved spring mounting as applied to a semi-elliptical spring of the Ford type, and also to a three quarter elliptical spring, but it is to be understood that the essential principles of my invention are capable of adaptation to other types of springs.

Figure 1:
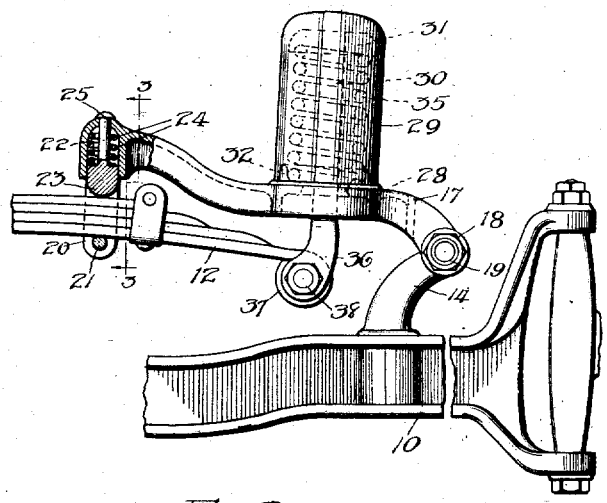
Figure 1 is a partial side elevation and partial section showing the adaptation of my invention to a front spring of the Ford type.
Figure 2:
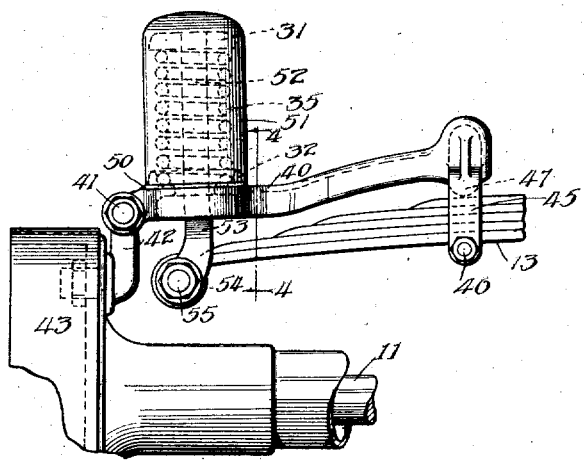
Figure 2 is a similar view showing the adaptation of my improvements to a rear spring of the Ford type.
Figure 3:
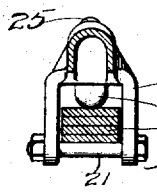
Figure 3 is a cross section on the line 3—3 of Figure 1.
Figure 5:
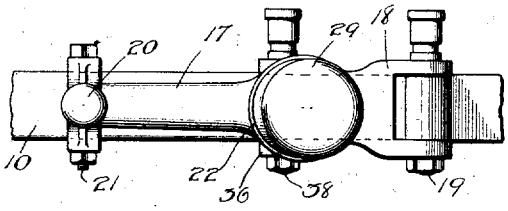
Figure 5 is a plan view of the device shown in Figure 1.
Figure 4:
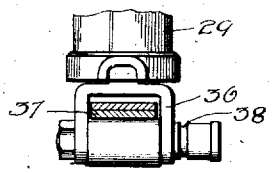
Figure 4 is a section on line 4—4 of Figure 2.

As shown in Figures 1 and 2 of the drawings, 10 designates the front axle and 11 the rear axle of the vehicle. 12 designates the front spring and 13 the rear spring thereof. Said springs are semi-elliptical and arranged longitudinally over the axles.

First referring to the arrangement of the front spring mounting, 14 designates a perch which is carried by the front axle, one at each end thereof, and which, in certain standard types of spring mounting, are inclined inwardly to support the ends of the spring 12 through the medium of shackles. In adapting my improvements to the type of spring shown in Figure 1, the perches 14 are reversed so as to incline toward the outer ends of the axle. 17 designates a lever which is formed at its outer end with a yoke 18 which is pivoted to the upstanding perch by means of a shackle bolt 19. The inner end of said lever extends inwardly over the spring 12 and is carried by a support that is movable relatively to the spring, so that said inner end of the lever is capable of movement relatively to the spring, longitudinally thereof. As herein shown, the inner end of the lever 17 is formed with a yoke 20, the downwardly turned arms of which fit over the sides of the spring 12. Said yoke arms are connected below the spring by a bolt 21 which is adapted to bear on the under side of the master leaf of the spring 12. Said yoke is shown as provided with a recess 22 to receive a plunger 23 which bears upon the upper leaf of the spring 12 and is pressed thereon through the action of a spiral spring 24 that is arranged within the chamber, between said plunger and the upper wall of the recess and surrounds said stem 25. This construction provides means for maintaining a clamping pressure of the yoke on the spring, regardless of the slight changes in the dimensions of the spring with which the yoke contacts due to endwise movement of the spring relatively to the yoke.

The lever 17 is provided between its ends with a ring shaped support 28 which receives the lower open edge of a casing 29 of a shock absorbing device. Said shock absorbing device may be made of any suitable type. As herein shown, it comprises, in combination with said casing, a stem or rod 30 provided at its upper end with a head or follower 31, between which and the lower wall 32 of the casing is interposed a spiral spring 35. The said rod or stem 30 is provided at its lower end with a yoke 36 which is pivoted to the eye 37 of the spring 12 by a shackle bolt 38.

With the construction described it will be noted that the weight of the load of the vehicle is transmitted to the front axle through the medium of both the main spring 12 and the auxiliary or shock absorbing spring 35 and that the arrangement is such that the lesser loads and minor shocks or vibrations thrown upon the spring suspension are taken care of and absorbed by said auxiliary spring 35, while the heavier loads and the larger vibrations are transmitted through the auxiliary spring to the main spring 12.

The shackle bolt 19 constitutes a fixed pivot for the lever 17 while the yoke connection 20 at the inner end of the lever with the spring 12 or equivalent connection with the springing elements is a floating connection; and the end of the spring 12 is suspended at a distance from its connection with its floating connection by the auxiliary spring 35. It will be observed furthermore that when a full load is thrown on the spring suspension and the main spring 12 flexes or straightens, the inner end of the lever 17 shifts relatively to the longitudinal axis of the spring 12 or equivalent springing element, due to the swinging movement of said lever 17. When the load is released the transfer of the loading from the spring 35 to that portion of the spring 12 inwardly beyond its end serves to retard the rebound or recoil action of the spring and to absorb or neutralize such recoil action of the main spring. Furthermore, the movement of the lever 17 relatively to the fixed pivot 19 thereof, its floating connection relatively to the springing support, and the connection of the main spring 12 with the auxiliary spring 35 is such as to maintain the plunger or stem 36 in proper relation to avoiding binding of the relatively movable parts upon each other and consequent irregular action. The arrangement shown, therefore, produces an exceedingly smooth, delicate spring action.

In the adaptation of my improvements to the rear spring, the lever 40, which takes the place of the lever 17 associated with the front spring, is connected by a shackle bolt 41 with an upstanding perch 42 which is fixed to the adjacent brake case by means of a screw threaded lug 43 in the manner indicated in Figure 2. The inner end of the lever is provided with a yoke 45, the arms of which fit downwardly alongside of the spring and are connected at their ends by a pin or bolt 46 which bears on the lower face of the master leaf of the spring. The said yoke is also provided with a spring pressed plunger 47, which acts in the manner of the plunger 23 before referred to to maintain a reliable clamping engagement of the yoke on the spring for the purposes hereinbefore set forth. Said lever 40 is provided between its ends with a ringlike support 50 to receive the lower end of the casing 51 of an auxiliary spring or shock absorbing device, the plunger 52 of which is provided with a yoke 53 that is pivoted to the spring eye 54 of the rear spring 13 by means of a shackle bolt 55.

The operation of the device thus described is essentially the same as the device shown in connection with the front spring, the structural differences being made necessary only by reason of the different manner of fastening the spring to the axle.

Figure 6:
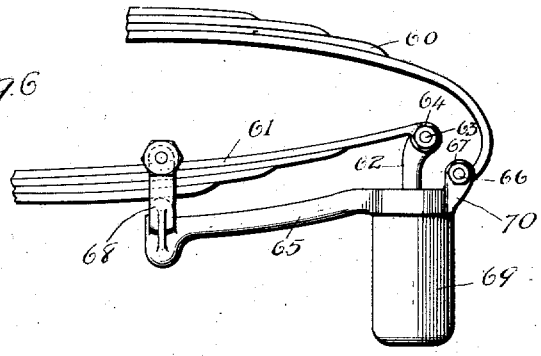
Figure 6 is a fragmentary view of another form of spring showing the adaptation of my improvements thereto.

In Figure 6 I have shown by improvements applied to a three quarter elliptical spring consisting of an upper scroll member 60 and a lower member 61. In this arrangement the yoke 62 of the plunger of the auxiliary spring or shock absorber is connected by a shackle bolt 63 to the eye 64 of the lower spring member 61. One end of the lever 65, corresponding to the lever 17 shown in Figure 1, is pivoted by a shackle bolt 66 to the eye 67 of the upper or scroll member 60 of the spring. The other or inner end of the lever 65 is connected to the lower member 61 of the spring by means of a clamp yoke 68 made essentially like the clamp yokes shown in the figures hereinbefore described.

The operation of the spring suspension as applied to this type of spring is essentially the same as that applied to the type of spring shown in Figures 1 and 2, the auxiliary spring being relied upon to take the lighter loads and absorb the lighter vibrations brought upon the spring suspension and the main spring member being relied upon to take the heavier loads and vibrations. In the construction shown in Figure 6, the outer end of the lever which carries the auxiliary or shock absorbing device terminates closely adjacent to the casing 69 for the auxiliary spring so that the improved device may be attached to standard spring arrangements without variations of the spring dimensions.

As before stated, it is to be understood that the essential principles of my improvements may be adapted to other types of spring suspensions used in connection with other means of connecting the spring to the chassis and body of the vehicle within the spirit and scope of the claims hereto appended. In the employment of my invention with a spring mounting which embraces a scroll body or dumb iron similar to the upper leaf 60 of the suspension shown in Figure 6, the auxiliary or shock absorbing device may be installed in the same general manner as shown in said figure.

In the construction shown and suggested, the swinging lever of the spring suspension (17, 40, and 65) is hinged to a relatively fixed part, as the perches 14, 42 shown in Figures 1 and 2, and the lug 70 shown in Figure 6, while the other or inner end is connected to a support that is movable relatively to the associated spring and vehicle body, being in the illustrative instance movably connected by a clamping yoke to the spring member with which it is associated a distance from the inside of the end of said spring member and the end of said spring member being pivotally connected to the auxiliary spring. It will be understood that the clamping action on the spring due to the clamping yokes described, is not sufficient in the normal positions of the parts of the spring suspension to prevent fairly easy movement of the main spring relatively to the yoke, the spring 24, and punger 23 being relied upon mainly as anti-rattling devices. Therefore, the frictional engagement of the clamping parts does not substantially restrict free movement of the parts so that the lesser loads and minor vibrations are efficiently transmitted to and absorbed by the auxiliary spring. The invention is, therefore, not limited to the details illustrated except as hereinafter made the subject of specific claims or as imposed by the prior art. For instance, the means for supporting the inner end of the cantilever may be varied as by movably supporting or suspending said lever from the body or said spring, whereby it is movable relatively to the spring and body. Furthermore, it is the intent to claim all of inherent novelty shown in the drawings and described in the specification.

I claim as my invention:

1. A spring suspension for vehicles comprising the combination with the main spring and its support, of a lever pivoted at one end to said support, means movable relatively to the said support to which the other end of the lever is connected, and a resilient connection directly between an end of said lever and said main spring and constituting the sole support for said end of the main spring.

2. A spring suspension for vehicles comprising the combination with the main spring and its support, of a lever pivoted to said support and overlapping said main spring, a spring over and movable relatively to said main spring, said lever being connected to said support, and an auxiliary spring carried between the ends of said lever and connected directly to, and constituting the sole support for, an end of the main spring.

3. A spring suspension for vehicles comprising, the combination with the main spring and a supporting bracket therefor, of a lever pivoted to said bracket and extending inwardly beyond the end of the main spring, means movable relatively to the said support by which the inner end of the lever is supported, and a resilient member carried by said lever and constituting the sole support for the end of said main spring.

4. A spring suspension for vehicles comprising, the combination with the main spring and a supporting bracket therefor, of a lever pivoted to said bracket and extending inwardly beyond the end of the main spring, supporting means movable relatively to the said support by which the inner end of the lever is supported, and a spring seated on said lever between the ends of the latter and connected to and constituting the sole support for the end of the main spring.

5. A spring suspension for vehicles comprising, the combination with the main spring and a supporting bracket therefor, of a lever pivoted to said bracket and extending inwardly beyond the end of the main spring, supporting means movable relatively to the said support by which the inner end of the lever is supported, a coiled spring seated on said lever, and a hanger connected to said spring and the main spring and constituting the sole support for the latter.

6. A spring suspension for vehicles comprising, in combination with the main spring and its support, of a lever pivoted to said support and movably engaging the main spring between the ends of the latter, and an auxiliary spring carried between the ends of the lever and connected to and affording the sole support for the main spring.

7. A spring suspension for vehicles comprising, in combination with the main spring and its support, of a lever pivoted to said support and movably engaging the main spring between the ends of the latter, and an auxiliary spring supported on and carried between the ends of the lever and pivotally connected to and affording the sole support for the end of the main spring.

8. A shock absorber and anti-recoil device for vehicle springs, comprising in combination with a main spring and its support, of a lever hinged at one end to the said support and sustained at its other end by means movable relatively to said support, and a spring carried by said lever to constitute the sole support for an end of the main spring and to transmit initial minor road shocks through the main spring to said body.

9. A shock absorber and anti-recoil device for vehicle springs, comprising, in combination with a main spring and its support, of a lever hinged to said support, and endwise lapping an end of the spring, and sustained at its other end by means movable relatively to said support, and an auxiliary initial shock absorbing and anti-recoil spring carried by said lever and connected directly to said main spring to unrestrainedly absorb initial shock absorbing and recoil stresses.

10. The combination with a main spring of a vehicle and its support, of means connected between the spring and said support in lieu of and unrestrained by the usual spring shackle, said means embracing an auxiliary spring connected directly to said main spring, and lever means supporting said auxiliary spring and hinged at one end to said support and connected to a part movable relatively to said support, and adapted to transmit shock absorbing and recoil check stresses to said auxiliary spring in one and the same direction of movement of said auxiliary spring.

11. In a spring suspension for vehicles, a main spring, a lever pivoted at one end to a relatively fixed support, a clamping yoke at the other end of the lever movably engaging the spring inside its end, an auxiliary spring supported on the lever between the ends of the latter and a plunger connected to the auxiliary spring and pivoted to the end of the main spring.

12. In a spring suspension for vehicles, a main spring provided at one end with an eye, a support for the spring, a lever pivoted at one end thereof to said support and extending inwardly beyond the outer end of said spring, means movable relatively to said spring to support the inner end of said lever, an auxiliary spring supported on said lever, and a plunger connected to said spring and pivoted to said eye of the main spring.

13. In a spring suspension for vehicles, a main spring, a lever pivoted at one end thereof to a relatively fixed support, a clamping yoke carried by the other end of the lever, the arms of which engage over the sides of said spring with a cross pin connecting the ends of said arms whereby the lever may be removably attached to the main spring, an auxiliary spring supported on the lever at its pivot end and a plunger connected to the auxiliary spring and pivoted to the end of the main spring.

14. In a spring suspension for vehicles, a main spring, a lever pivoted at one end to a relatively fixed support, a clamping yoke at the other end of the lever movably engaging the spring, said lever being provided between its ends with a ring-like frame, a casing supported on the ring-like frame, a plunger slidable in the casing and provided at one end with a head, a spring between the head and the lower end of the casing and means to connect the plunger to the end of the main spring.

Chicago, Illinois, November 18th, 1918.

THOMAS I. DUFFY.